US012555263B2

(12) United States Patent
Levy et al.

(10) Patent No.: US 12,555,263 B2
(45) Date of Patent: Feb. 17, 2026

(54) SYSTEMS AND METHODS FOR TWO-STAGE OBJECTION DETECTION

(71) Applicant: Tyco Fire & Security GmbH, Neuhausen am Rheinfall (CH)

(72) Inventors: Ran Levy, Rishon Lezion (IL); Amit Rozner, Yehud (IL); Yohay Falik, Petah Tiqwa (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 292 days.

(21) Appl. No.: 18/063,819

(22) Filed: Dec. 9, 2022

(65) Prior Publication Data

US 2024/0193805 A1    Jun. 13, 2024

(51) Int. Cl.
G06T 7/73      (2017.01)
G06T 3/02      (2024.01)
G06T 7/13      (2017.01)
G06V 40/16     (2022.01)

(52) U.S. Cl.
CPC ............ *G06T 7/73* (2017.01); *G06T 3/02* (2024.01); *G06T 7/13* (2017.01); *G06V 40/167* (2022.01)

(58) Field of Classification Search
CPC .... G06T 7/73; G06T 3/02; G06T 7/13; G06V 40/167; G06V 40/161
See application file for complete search history.

(56) References Cited

U.S. PATENT DOCUMENTS

| 9,064,172 B2 * | 6/2015 | Jia ........................ G06V 40/107 |
| 2013/0057728 A1 * | 3/2013 | Ushijima ............. H04N 23/675 |
| | | 348/222.1 |
| 2015/0347822 A1 * | 12/2015 | Zhou ...................... G06V 10/82 |
| | | 382/118 |

(Continued)

FOREIGN PATENT DOCUMENTS

CN          109598290 A       4/2019

OTHER PUBLICATIONS

Koyun, Onur Can, et al. "Focus-and-Detect: A small object detection framework for aerial images." Signal Processing: Image Communication 104 (2022): 116675. (Year: 2022).*

(Continued)

*Primary Examiner* — Henok Shiferaw
*Assistant Examiner* — Dion J Satcher
(74) *Attorney, Agent, or Firm* — ArentFox Schiff LLP

(57) ABSTRACT

Example implementations include a method, apparatus and computer-readable medium for detecting an object in an image, by applying, on a first input image, a first object detector configured to generate a bounding box around the object in the first input image. The implementations further include identifying a first bounding box having a first bounding box size around the object in the first input image and determining that the first bounding box size is less than a threshold size. Additionally, the implementations further include generating a second input image by cropping an area of the original image corresponding to the first bounding box and identifying, by applying a second object detector on the second input image, a second bounding box around the object in the second input image. Additionally, the implementations further include performing an image analysis function on the object using information from the second bounding box.

25 Claims, 5 Drawing Sheets

(56) References Cited

U.S. PATENT DOCUMENTS

| | | | | |
|---|---|---|---|---|
| 2021/0133861 | A1* | 5/2021 | Kumar | G06F 18/214 |
| 2021/0192231 | A1* | 6/2021 | Lee | G05D 1/0231 |
| 2021/0200993 | A1* | 7/2021 | Chen | G06V 40/168 |
| 2021/0295054 | A1* | 9/2021 | Ramanathan | G06V 20/52 |
| 2022/0180649 | A1* | 6/2022 | Li | G06V 40/10 |
| 2023/0038364 | A1* | 2/2023 | Bhowmick | G06N 3/045 |
| 2023/0049339 | A1* | 2/2023 | Ganguly | H04N 23/80 |
| 2023/0133854 | A1* | 5/2023 | Vaezi Joze | G06F 18/2163 348/222.1 |

OTHER PUBLICATIONS

Ruzicka, et al., Fast and accurate object detection in high resolution 4K and 8K video using GPUs, Department of Electrical and Computer Engineering, Carnegie Mellon University, 7 pages.

* cited by examiner

400

502

Performing, in response to determining that the first bounding box size is not less than the threshold size, the image analysis function on the object using information from the first bounding box in the first input image

Comparing, using the facial recognition algorithm, the face in the second bounding box with another face

604

Generating an alert indicative of a match in response to determining, based on the comparing, that the face and the another face match

Fig. 6

SYSTEMS AND METHODS FOR TWO-STAGE OBJECTION DETECTION

BACKGROUND

Technical Field

Aspects of the present disclosure relate generally to object detection systems, and more particularly, to systems and methods for two-stage object detection.

Introduction

Accurate object detection is important for several applications. For example, if the object is a face, the applications may include face recognition, liveness detection, mask detection, gaze detection, etc. If the object is a car, the applications may include traffic analysis, smart driving, collision prevention, etc. If the object is a ball, the applications may include game analysis, player training/evaluation, sports broadcasting, etc. While there are many deep-learning object detectors available, it is difficult to achieve fast and accurate detections on small objects in images. If an object is too small in an image, for example, the object and/or its features may not be properly identified.

Conventional systems are unable to address these issues. Accordingly, there exists a need for improvements in such object detection systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for detecting an object in an image, comprising generating a first input image for a first object detector by adjusting an original image size of an original image depicting the object to a first input image size, wherein the first object detector is a classifier configured to generate a bounding box around the object in the first input image. The method further includes identifying, by applying the first object detector on the first input image, a first bounding box having a first bounding box size around the object in the first input image. Additionally, the method further includes determining whether the first bounding box size is less than a threshold size. Additionally, the method further includes generating, in response to determining that the first bounding box size is less than the threshold size, a second input image by cropping an area of the original image corresponding to the first bounding box, wherein a second input image size of the second input image is greater than the first bounding box size. Additionally, the method further includes identifying, by applying a second object detector on the second input image, a second bounding box around the object in the second input image. Additionally, the method further includes performing an image analysis function on the object using information from the second bounding box in the second input image.

Another example aspect includes an apparatus for detecting an object in an image, comprising a memory and a processor coupled with the memory. The processor is configured to generate a first input image for a first object detector by adjusting an original image size of an original image depicting the object to a first input image size, wherein the first object detector is a classifier configured to generate a bounding box around the object in the first input image. The processor is further configured to identify, by applying the first object detector on the first input image, a first bounding box having a first bounding box size around the object in the first input image. Additionally, the processor further configured to determine whether the first bounding box size is less than a threshold size. Additionally, the processor further configured to generate, in response to determining that the first bounding box size is less than the threshold size, a second input image by cropping an area of the original image corresponding to the first bounding box, wherein a second input image size of the second input image is greater than the first bounding box size. Additionally, the processor further configured to identify, by applying a second object detector on the second input image, a second bounding box around the object in the second input image. Additionally, the processor further configured to perform an image analysis function on the object using information from the second bounding box in the second input image.

Another example aspect includes an apparatus for detecting an object in an image, comprising means for generating a first input image for a first object detector by adjusting an original image size of an original image depicting the object to a first input image size, wherein the first input image size is less than the original image size, wherein the first object detector is a classifier configured to generate a bounding box around the object in the first input image. The apparatus further includes means for identifying a first bounding box having a first bounding box size around the object in the first input image. Additionally, the apparatus further includes means for determining whether the first bounding box size is less than a threshold size. Additionally, the apparatus further includes means for generating, in response to determining that the first bounding box size is less than the threshold size, a second input image by cropping an area of the original image corresponding to the first bounding box, wherein a second input image size of the second input image is greater than the first bounding box size. Additionally, the apparatus further includes means for identifying a second bounding box around the object in the second input image. Additionally, the apparatus further includes means for performing an image analysis function on the object using information from the second bounding box in the second input image.

Another example aspect includes a computer-readable medium having instructions stored thereon for detecting an object in an image, wherein the instructions are executable by a processor to generate a first input image for a first object detector by adjusting an original image size of an original image depicting the object to a first input image size, wherein the first object detector is a classifier configured to generate a bounding box around the object in the first input image. The instructions are further executable to identify, by applying the first object detector on the first input image, a first bounding box having a first bounding box size around the object in the first input image. Additionally, the instructions are further executable to determine whether the first bounding box size is less than a threshold size. Additionally, the instructions are further executable to generate, in response to determining that the first bounding box size is less than the threshold size, a second input image by cropping an area of the original image corresponding to the first bounding box, wherein a second input image size of the second input image is greater than the first bounding box size. Additionally, the instructions are further executable to identify, by applying a second object detector on the second input image, a second bounding box around the object in the second input image. Additionally, the instructions are further executable to perform an image analysis function on the object using information from the second bounding box in the second input image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 5 is a flowchart of additional aspects of the method of FIG. 4; and

FIG. 6 is a flowchart of additional aspects of the method of FIG. 4;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide two-stage object detection. In the first stage, the original image is processed (e.g., resized to smaller dimensions and/or padded) to achieve the dimensions of an input image for an object detector. The object detector is then activated and roughly detects the location(s) of the object(s) in the input image. The original image is then used to crop the detected object(s) in the original resolution and a second stage detector is applied on the cropped object(s) to refine the object location and identify object features. Because the cropped image(s) are larger than the detected object(s) in the input image, but are smaller than the input image itself, the accuracy is improved and fast throughput is achieved. The object location (e.g., bounding box) and object features (e.g., keypoints) may then be used for any of the applications previously described depending on the object being detected (e.g., facial recognition, traffic analysis, sports analysis, etc.).

Figure 1:
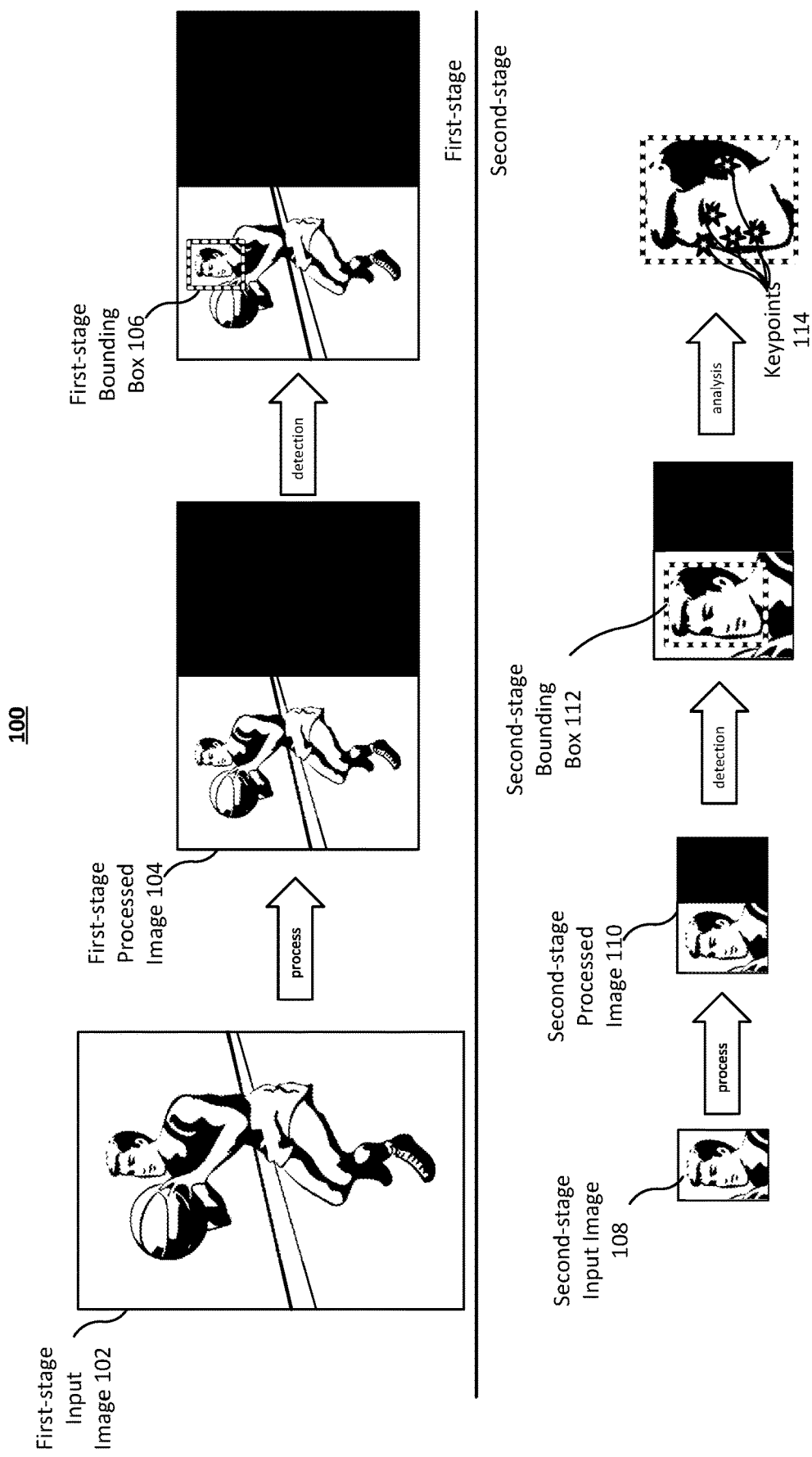
FIG. 1 is a diagram of two-stage object detection, in accordance with exemplary aspects of the present disclosure.

FIG. 1 is diagram 100 of two-stage object detection, in accordance with exemplary aspects of the present disclosure. Diagram 100 includes first-stage input image 102, which may be acquired from a camera or an image source (e.g., a server). Image 102 may be a photograph of a basketball player. An object detection component may comprise an object detector configured to identify a type of object in first-stage input image 102. For example, the object detector may be a neural network (e.g., YOLO) that is configured to detect faces. Other examples of object types include, but are not limited to, animate objects such as animals and humans, and inanimate objects such as vehicles and furniture. One skilled in the art will appreciate that virtually any object type may be detected by the object detector; an objective of the present disclosure is to improve detection of that object type and its features without overly exhausting processing resources and causing high latencies.

This improvement is achieved using a two-stage setup. In the first stage, the object detection component processes first-stage input image 102, including, for example but not limited hereto, to achieve the required dimensions for an input image for the object detector. The processing may involve cropping, resizing, downsampling, upsampling, padding, etc. For example, but not limited hereto, first-stage input image 102 may be an image of size 540×960. However, the object detector may only accept input images with the dimensions 384×224. The object detection component may resize image 102 and pad the image on the right side to yield first-stage processed image 104. In general, the processing will retain the entire contents of the original image and remain proportional to the original image (e.g., without skewing/stretching a certain portion more than another portion). The object detector may then be applied on first-stage processed image 104, and may output an image with first-stage bounding box 106. Suppose that the object detector is configured to detect faces in an image. Accordingly, bounding box 106 may generally surround the head of the basketball player in the image.

The object detection component may then map the contents of bounding box 106 with input image 102. This mapping may involve generating a bounding box in input image 102 that is proportional in size and location to bounding box 106. Subsequent to determining a mapping, the object detection component may crop the mapped bounding box to generate second-stage input image 108. For example, but not limited hereto, the second-stage input image 108 may be a 60×40 image capturing the contents of bounding box 106 in the resolution of input image 102. The processing step in the first-stage may reduce the size of the image such that bounding box 106 has a size of 30×20 pixels. Because of the mapping, second-stage input image 108 is cropped from input image 102 rather than from image 104. This ultimately yields a higher resolution image of the detected object (e.g., the head).

In some aspects, the object detector used in the second stage may be the same object detector used in the first stage. In some aspects, the object detector used in the second stage (henceforth referred to as the second object detector) may be different from the object detector used in the first stage (henceforth referred to as the first object detector). More specifically, the second object detector may be a faster detector that processes smaller images. For example, but not limited hereto, the input image for the second object detector may need to be 96×96 pixels in size (compared to 384×224 pixels of the first object detector). The object detection component may process input image 108 (e.g., crop, pad, resize, etc.,) to yield second-stage processed image 110, which has the required dimensions for the second object detector. In some aspects, the second object detector may be applied on a larger sized and upsampled version of second-stage input image 108. For example, bounding box 106 as mapped in input image 102 (i.e., input image 108) may be 60×40 pixels. To achieve 96×96 pixels, rather than padding the image, the object detection component may increase the size of input image 108 and upsample to improve sharpness.

The object detection component may then apply the second object detector on image 110 to generate second-stage bounding box 112 and keypoints 114. It should be noted that bounding box 112 is smaller in size than input image 108 as the focus is tighter around the object. FIG. 1 depicts are larger image for the contents of bounding box 112 for better visualization of keypoints 114.

Because bounding box 106 is smaller than input image 108, the second object detector is better able to generate a bounding box that removes portions of the image that do not include the object. For example, bounding box 106 includes a hand, neck, and shoulder of the basketball player. Bounding box 112 removes the portion including the hand and shoulder to focus in on the head. An improved bounding box is especially important in applications where background noise can greatly influence an output. For example, a facial recognition algorithm that receives bounding box 106 and bounding box 112 may be unable to discern the portions of the head as successfully using bounding box 106 and may confuse the hand and shoulder in bounding box 106 to be facial features. In contrast, the facial recognition algorithm may successfully classify the basketball player using the contents of bounding box 112.

In terms of speed, because the second object detector is faster than the first object detector and because the size of image 110 is smaller than the size of image 104, the latency caused by undergoing the second stage is negligible relative to the time used for the first stage. Nevertheless, in an exemplary aspect, the object detection component may evaluate whether to proceed with the second stage based on a size of bounding box 106 relative to a size of image 104. This evaluation is further described in reference to FIG. 2.

Figure 2:
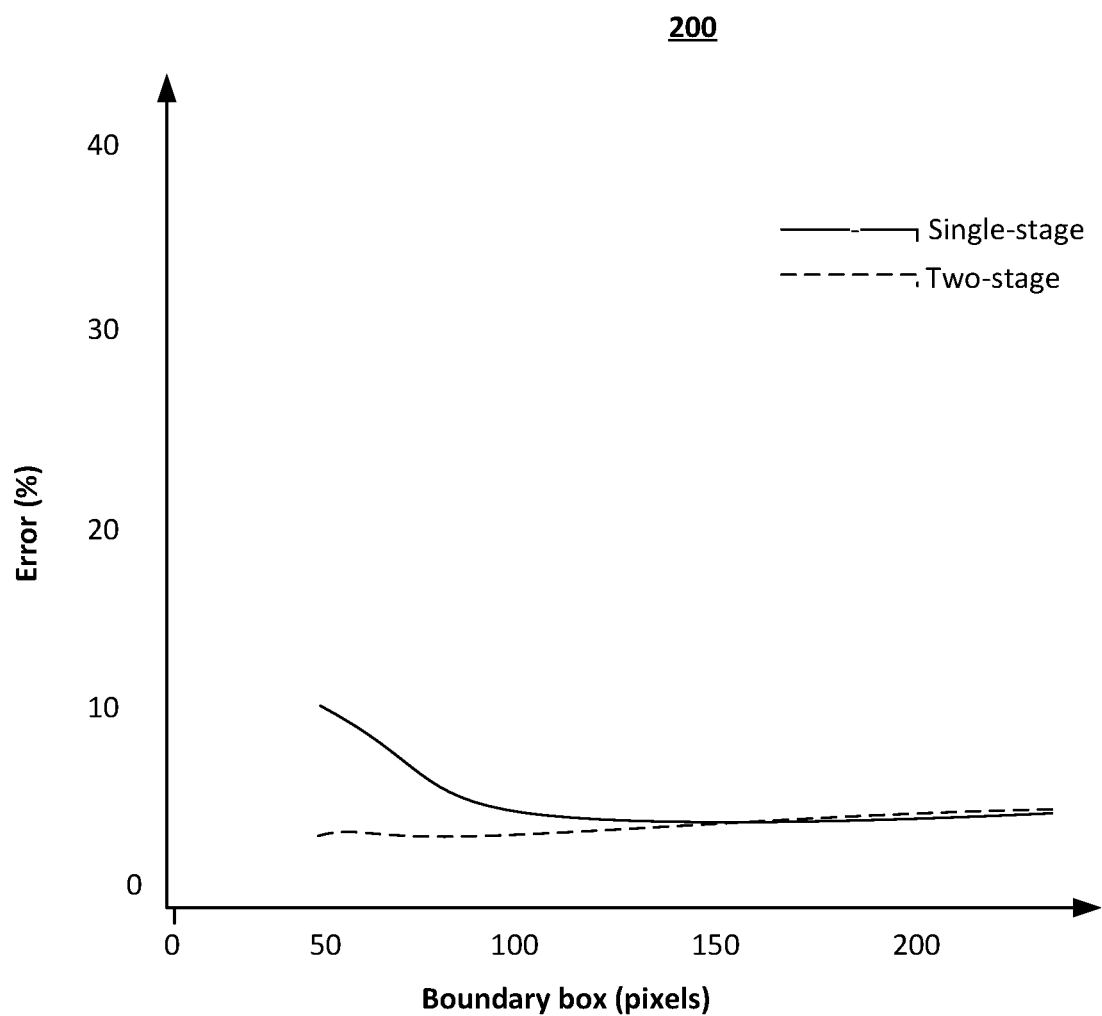
FIG. 2 is a graph depicting the error rate for single-stage object detection and two-stage object detection relative to a size of a bounding box surrounding a detected object, in accordance with exemplary aspects of the present disclosure.

FIG. 2 is graph 200 depicting one example of the error rate for single-stage object detection and two-stage object detection relative to a size of a bounding box surrounding a detected object, in accordance with exemplary aspects of the present disclosure. Graph 200 measures error rates by comparing the locations of keypoints detected by the first stage/second stage and the locations of keypoints manually identified as the true keypoints. The error rates are mapped to the size of boundary boxes.

As the size of the boundary boxes increases (implying that the object is getting larger in the input images), the error rates of both the single-stage and two-stage detection methods is relatively the same. However, when the object is small (e.g., between the size of 50 pixels and 150 pixels), the error rate of the single-stage detection method is considerably greater than the two-stage detection method.

Based on this behavior, the object detection component may determine whether time and processing should be invested in the two-stage detection method based on the size of the boundary box generated from the single-stage detection method. For example, the object detection component may only enter the second stage if the boundary box is less than a threshold size (e.g., less than 20% of the processed image, 150 pixels, etc.) If the boundary box is not less than the threshold size, the size of the object may be large enough such that the results from the single-stage detection method may be comparable to the two-stage detection method; accordingly, investing time and processing resources may not be efficient.

Figure 3:
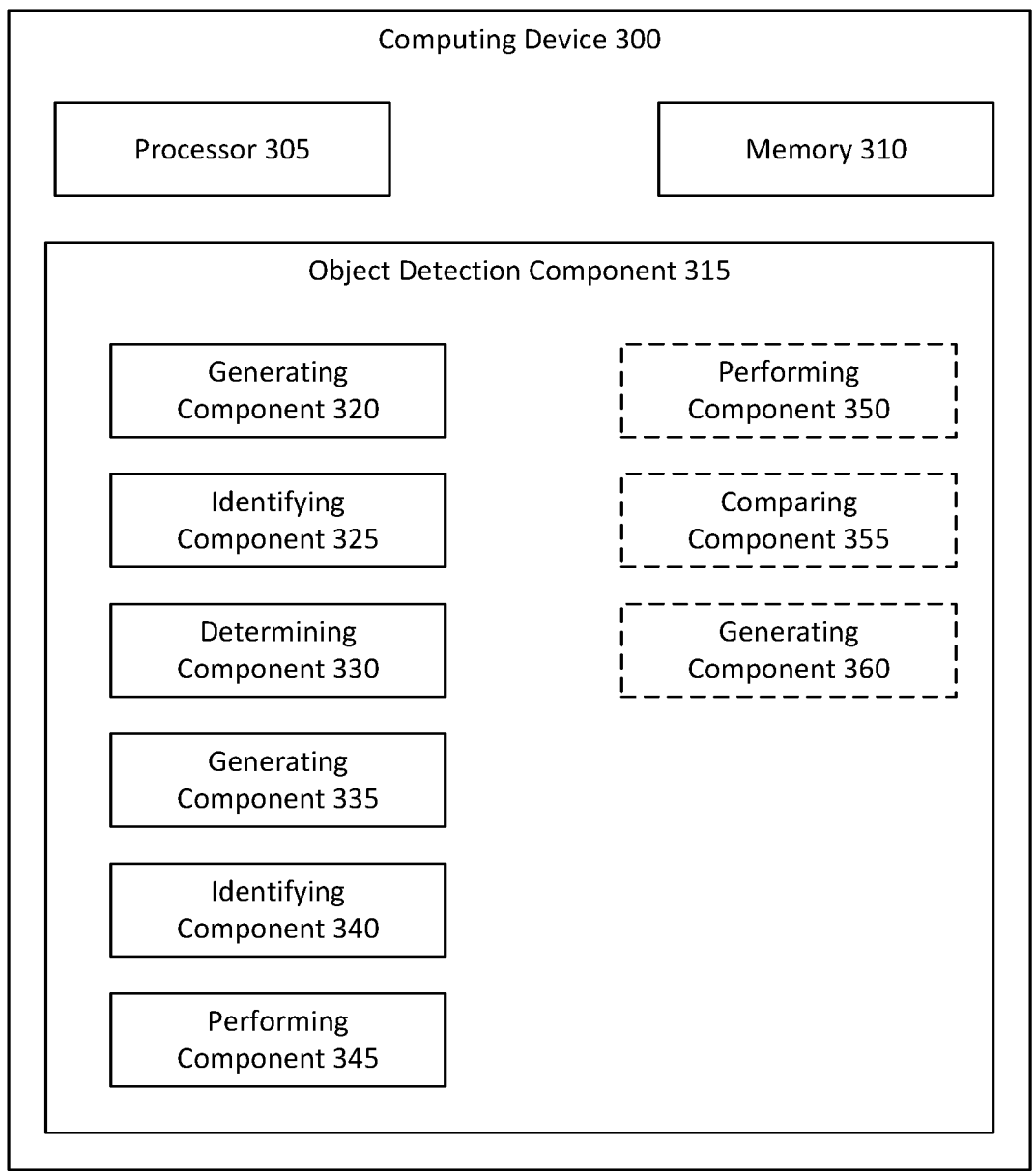
FIG. 3 is a block diagram of an example of a computer device having components configured to perform a method for detecting an object in an image.
Figure 4:
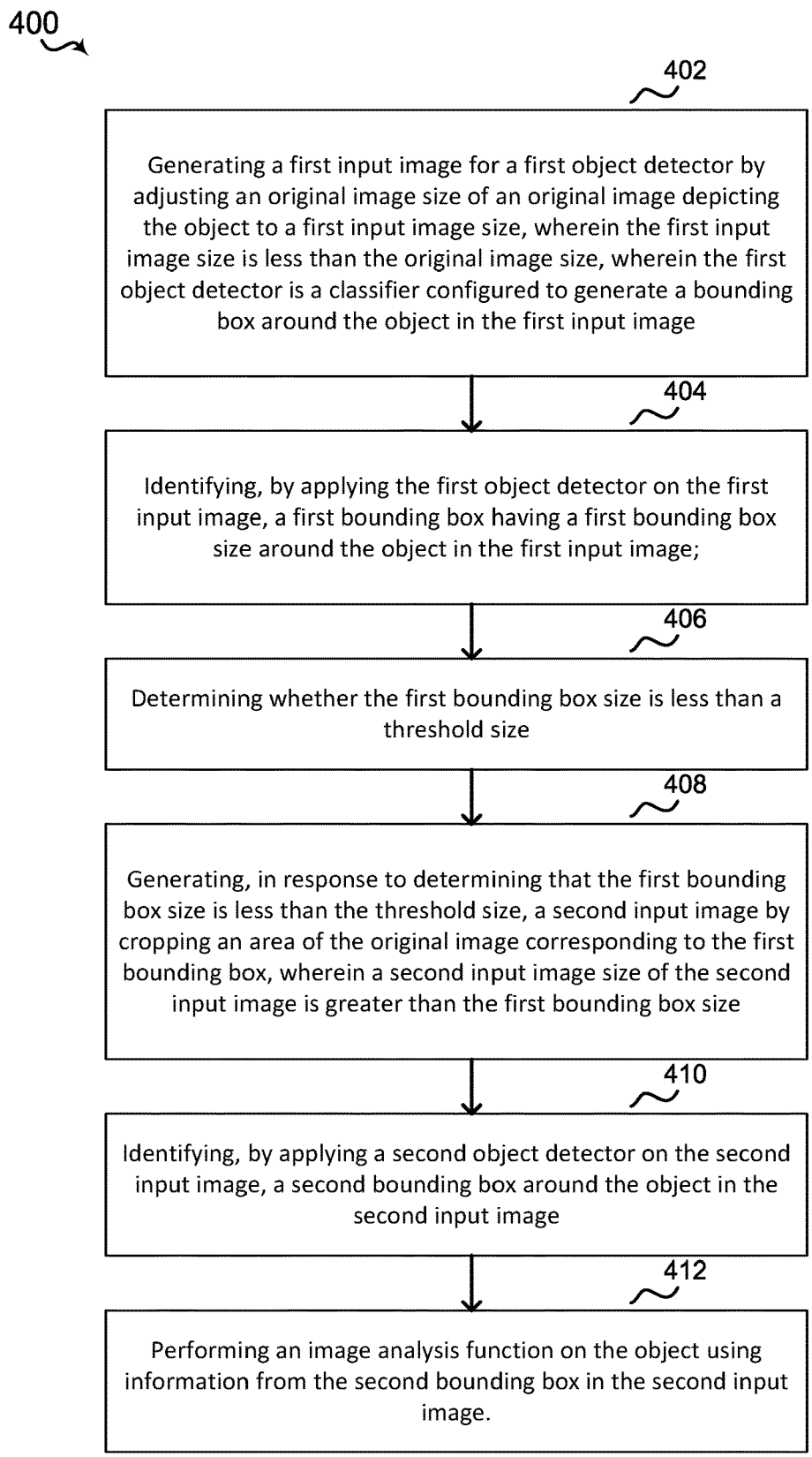
FIG. 4 is a flowchart of a method for detecting an object in an image.

Referring to FIG. 3 and FIG. 4, in operation, computing device 300 may perform a method 400 of detecting an object in an image, by such as via execution of object detection component 315 by processor 305 and/or memory 310.

At block 402, the method 400 includes generating a first input image for a first object detector by adjusting an original image size of an original image depicting the object to a first input image size, wherein the first input image size is less than the original image size, wherein the first object detector is a classifier configured to generate a bounding box around the object in the first input image.

For example, in an aspect, computing device 300, processor 305, memory 310, object detection component 315, and/or generating component 320 may be configured to or may comprise means for generating first-stage processed image 104 for a first object detector by adjusting an original image size of first-stage input image 102 depicting the object to a first input image size. In this example, the first input image size may be 384×224 pixels and the original image size may be 540×960 pixels. The first object detector may be a classifier such as the YOLO neural network that is configured to generate a bounding box around the object in the first-stage processed image 104. In an alternative or additional aspect, adjusting the original image size comprises one or more of resizing, cropping, padding, or rotating.

At block 404, the method 400 includes identifying, by applying the first object detector on the first input image, a first bounding box having a first bounding box size around the object in the first input image. For example, in an aspect, computing device 300, processor 305, memory 310, object detection component 315, and/or identifying component 325 may be configured to or may comprise means for identifying, by applying the first object detector on first-stage processed image 104, a first-stage bounding box 106 having a first bounding box size (e.g., 30×20 pixels) around the object in first-stage processed image 104.

At block 406, the method 400 includes determining whether the first bounding box size is less than a threshold size. For example, in an aspect, computing device 300, processor 305, memory 310, object detection component 315, and/or determining component 330 may be configured to or may comprise means for determining whether the first bounding box size of 30×20 pixels is less than a threshold size.

In some aspects, the threshold size may be a rectangular bounding box size that is preset (e.g., 40×30 pixels). Object detection component 315 may compare each individual measurement (e.g., length compared to length and width compared to width).

In an alternative or additional aspect, the threshold size is a ratio of the first bounding box size relative to the first input image size. In this aspect, as one non-limiting example, the ratio is between 5%-20%, but may more preferably be 5%-10%. Accordingly, object detection component 315 may determine an area under 30×20 pixels to be 600 (i.e., the first bounding box size) and compare it to, for example, 5% of the area under first-stage processed image 104. This range between 5% to 20% originates from the discussion of FIG. 2.

At block 408, the method 400 includes generating, in response to determining that the first bounding box size is less than the threshold size, a second input image by cropping an area of the original image corresponding to the first bounding box, wherein a second input image size of the second input image is greater than the first bounding box size.

For example, in an aspect, computing device 300, processor 305, memory 310, object detection component 315, and/or generating component 335 may be configured to or may comprise means for generating, in response to determining that the first bounding box size (e.g., 30×20 pixels) is less than the threshold size (e.g., 40×30 pixels), second-stage input image 108 by cropping an area of first-stage input image 102 corresponding to first-stage bounding box 106. Referring to FIG. 1, first-stage bounding box 106 encompasses the head of the basketball player as well as portions of the neck, chest, hand, and shoulder. The exact contents encompassed by first-stage bounding box 106 are cropped from first-stage input image 102. Because the crop is taken from the first-stage input image 102 instead of first-stage processed image 104, a second input image size of second-stage input image 108 (e.g., 60×40 pixels) is greater than the first bounding box size of first-stage bounding box 106 (e.g., 30×20 pixels).

At block 410, the method 400 includes identifying, by applying a second object detector on the second input image, a second bounding box around the object in the second input image. For example, in an aspect, computing device 300, processor 305, memory 310, object detection component 315, and/or identifying component 340 may be configured to or may comprise means for identifying, by applying a second object detector on the second input image, second-stage bounding box 112 around the object in the second input image.

In one example, if the second input image already meets the dimensional requirements of the second object detector, second-stage input image 108 may be directly provided as an input of the second object detector. However, in some aspects, if second-stage input image 108 does not meet the dimensional requirements of the second object detector, object detection component 315 may perform processing (e.g., rotating, padding, resizing, etc.) to generate second-stage processed image 110, which serves as the input to the second object detector.

In an alternative or additional aspect, a second ratio of an object size of the object relative to second-stage bounding box 112 is greater than a first ratio of the object size relative to first-stage bounding box 106. This indicates that the second-stage bounding box 112 focuses in on the object better than the first-stage bounding box 106.

In an alternative or additional aspect, the second object detector and first object detector are a same classifier. For example, both may be a YOLO neural network. This keeps the entire system simple as there are not multiple detectors that need to be trained or configured.

In an alternative or additional aspect, the second object detector is a second classifier having a second processing speed that is faster than a first processing speed of the first object detector. For example, the second classifier may accept and process smaller input images than the first object detector (i.e., the first input image size is larger than the second input image size). In some aspects, the second object detector may be a neural network with fewer layers and/or neurons, which enables quicker throughputs.

At block 412, the method 400 includes performing an image analysis function on the object using information from the second bounding box in the second input image. For example, in an aspect, computing device 300, processor 305, memory 310, object detection component 315, and/or performing component 345 may be configured to or may comprise means for performing an image analysis function on the object using information from second-stage bounding box 112 in the second-stage input image.

In an alternative or additional aspect, the image analysis function comprises one or more of keypoint detection, object classification, edge detection, segmentation, pose estimation, noise filtering, or any other function involving the analysis of images that would suffer from accuracy degradation caused when considering small objects. For example, in FIG. 1, keypoints 114 are determined from the contents of second-stage bounding box 112. These keypoints outline the positions of facial features (e.g., eyes, nose, mouth, car, etc.). Only a few keypoints are shown for simplicity. If the image analysis function were performed on the object using information from first-stage bounding box 106, because the image is smaller and because the image is not entirely focused on the head of the basketball player, the keypoints may not be fully identified or may not be in the proper location.

Referring to FIG. 5, in an alternative or additional aspect, at block 502, the method 400 may further include performing, in response to determining that the first bounding box size is not less than the threshold size, the image analysis function on the object using information from the first bounding box in the first input image. For example, in an aspect, computing device 300, processor 305, memory 310, object detection component 315, and/or performing component 350 may be configured to or may comprise means for performing, in response to determining that first-stage bounding box size 106 is not less than the threshold size, the image analysis function on the object using information from first-stage bounding box 106 in first-stage processed image 104.

This is a mechanism that prevents unnecessary processing and latencies. When the image in the first bounding box is large enough (i.e., larger than the threshold size), the image is adequate for applying an image analysis function. In some aspects, the threshold size may vary depending on the image analysis function to be applied and/or the object type. For example, the threshold size may be set as 60×40 pixels for person images where a face is being detected, while the threshold size may be set as 40×30 pixels for vehicle images where a car is being detected. Likewise, the threshold size may be set as 60×40 pixels for keypoint detection, while the threshold size may be set as 40×30 pixels for edge detection.

In an alternative or additional aspect, identifying, by applying the second object detector on the second input image, the second bounding box around the object in the second input image further comprises identifying a set of keypoints associated with the object in the second image.

Referring to FIG. 6, in an alternative or additional aspect wherein the object is a face of a person and wherein the image analysis function is a facial recognition algorithm, at block 602, the method 400 may further include comparing, using the facial recognition algorithm, the face in the second bounding box with another face. For example, in an aspect, computing device 300, processor 305, memory 310, object detection component 315, and/or comparing component 355 may be configured to or may comprise means for comparing, using the facial recognition algorithm, the face in second-stage bounding box 112 with another face in an image database.

In this optional aspect, at block 604, the method 400 may further include generating an alert indicative of a match in response to determining, based on the comparing, that the face and the another face match. For example, in an aspect, computing device 300, processor 305, memory 310, object detection component 315, and/or generating component 360 may be configured to or may comprise means for generating an alert indicative of a match in response to determining, based on the comparing, that the face and the another face match. In some aspects, this may involve comparing the keypoints in each facial image to determine whether at least a threshold amount of keypoints match.

In an alternative or additional aspect, identifying, by applying the second object detector on the second input image, the second bounding box around the object in the second input image further comprises identifying a set of keypoints associated with the object in the second image, and wherein comparing, using the facial recognition algorithm, the face in the second bounding box with the another face further comprises comparing the set of keypoints with a known set of keypoints associated with the another face.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for detecting an object in an image, comprising:
    a memory; and
    a processor coupled with the memory and configured to:
        generate a first input image for a first object detector by adjusting an original image size of an original image depicting the object to a first input image size, wherein the first object detector is a classifier configured to generate a bounding box around the object in the first input image;
        identify, by applying the first object detector on the first input image, a first bounding box having a first bounding box size around the object in the first input image;
        determine whether the first bounding box size is less than a threshold size;
        generate, in response to determine that the first bounding box size is less than the threshold size, a second input image by enlarging and upsampling a cropped area of the original image corresponding to the first bounding box, wherein a second input image size of the second input image is greater than the first bounding box size and less than the first input image size;
        identify, by applying a second object detector on the second input image, a second bounding box around the object in the second input image, wherein the second object detector is a second classifier having a second processing speed that is different than a first processing speed of the first object detector, and wherein a difference in processing speed between the second object detector and the first object detector is based on the second object detector having a different number of layers and/or neurons and processing different sized images relative to the first object detector; and
        perform an image analysis function on the object using information from the second bounding box in the second input image.

2. The apparatus of claim 1, wherein adjusting the original image size comprises one or more of resizing, cropping, padding, or rotating.

3. The apparatus of claim 1, wherein the threshold size is a ratio of the first bounding box size relative to the first input image size.

4. The apparatus of claim 3, wherein the ratio is between 5%-20%.

5. The apparatus of claim 1, wherein the first input image size is less than the original image size and wherein the first input image size is larger than the second input image size.

6. The apparatus of claim 1, wherein adjusting the original image size comprises adjusting to meet first dimension requirements for the first object detector, and wherein to generate the second input image the processor is further configured to adjust the second input image size to meet second dimension requirements for the second object detector.

7. The apparatus of claim 1, wherein a second ratio of an object size of the object relative to the second bounding box is greater than a first ratio of the object size relative to the first bounding box.

8. The apparatus of claim 1, wherein the processor is further configured to:
    perform, in response to determine that the first bounding box size is not less than the threshold size, the image analysis function on the object using information from the first bounding box in the first input image.

9. The apparatus of claim 1, wherein the image analysis function comprises one or more of keypoint detection, object classification, edge detection, segmentation, pose estimation, or noise filtering.

10. The apparatus of claim 1, wherein to identify, by applying the second object detector on the second input image, the second bounding box around the object in the second input image the processor is further configured to identify a set of keypoints associated with the object in the second image.

11. The apparatus of claim 1, wherein the object is a face of a person and wherein the image analysis function is a facial recognition algorithm, wherein the processor is further configured to:
    compare, using the facial recognition algorithm, the face in the second bounding box with another face; and
    generate an alert indicative of a match in response to determining, based on the comparing, that the face and the another face match.

12. The apparatus of claim 11, wherein to identify, by applying the second object detector on the second input image, the second bounding box around the object in the second input image the processor is further configured to identify a set of keypoints associated with the object in the second image, and wherein comparing, using the facial recognition algorithm, the face in the second bounding box with the another face the processor is further configured to compare the set of keypoints with a known set of keypoints associated with the another face.

13. The method of claim 1, wherein the second object detector is a second classifier having a second processing speed that is faster than a first processing speed of the first object detector, and wherein a difference in processing speed between the second object detector and the first object detector is based on the second object detector having fewer layers and/or neurons and processing smaller images relative to the first object detector.

14. A method for detecting an object in an image, comprising:
  generating a first input image for a first object detector by adjusting an original image size of an original image depicting the object to a first input image size, wherein the first object detector is a classifier configured to generate a bounding box around the object in the first input image;
  identifying, by applying the first object detector on the first input image, a first bounding box having a first bounding box size around the object in the first input image;
  determining whether the first bounding box size is less than a threshold size;
  generating, in response to determining that the first bounding box size is less than the threshold size, a second input image by enlarging and upsampling a cropped area of the original image corresponding to the first bounding box, wherein a second input image size of the second input image is greater than the first bounding box size and less than the first input image size;
  identifying, by applying a second object detector on the second input image, a second bounding box around the object in the second input image, wherein the second object detector is a second classifier having a second processing speed that is different than a first processing speed of the first object detector, and wherein a difference in processing speed between the second object detector and the first object detector is based on the second object detector having a different number of layers and/or neurons and processing different sized images relative to the first object detector; and
  performing an image analysis function on the object using information from the second bounding box in the second input image.

15. The method of claim 14, wherein adjusting the original image size comprises one or more of resizing, cropping, padding, or rotating.

16. The method of claim 14, wherein the threshold size is a ratio of the first bounding box size relative to the first input image size.

17. The method of claim 16, wherein the ratio is between 5%-20%.

18. The method of claim 14, wherein the first input image size is less than the original image size and wherein the first input image size is larger than the second input image size.

19. The method of claim 14, wherein adjusting the original image size comprises adjusting to meet first dimension requirements for the first object detector, and wherein generating the second input image further comprises adjusting the second input image size to meet second dimension requirements for the second object detector.

20. The method of claim 14, wherein a second ratio of an object size of the object relative to the second bounding box is greater than a first ratio of the object size relative to the first bounding box.

21. The method of claim 14, further comprising:
  performing, in response to determining that the first bounding box size is not less than the threshold size, the image analysis function on the object using information from the first bounding box in the first input image.

22. The method of claim 14, wherein the image analysis function comprises one or more of keypoint detection, object classification, edge detection, segmentation, pose estimation, or noise filtering.

23. The method of claim 14, wherein identifying, by applying the second object detector on the second input image, the second bounding box around the object in the second input image further comprises identifying a set of keypoints associated with the object in the second image.

24. The method of claim 14, wherein the object is a face of a person and wherein the image analysis function is a facial recognition algorithm, further comprising:
  comparing, using the facial recognition algorithm, the face in the second bounding box with another face; and
  generating an alert indicative of a match in response to determining, based on the comparing, that the face and the another face match.

25. The method of claim 24, wherein identifying, by applying the second object detector on the second input image, the second bounding box around the object in the second input image further comprises identifying a set of keypoints associated with the object in the second image, and wherein comparing, using the facial recognition algorithm, the face in the second bounding box with the another face further comprises comparing the set of keypoints with a known set of keypoints associated with the another face.

* * * * *